United States Patent [19]

Cheron et al.

[11] Patent Number: 5,280,992
[45] Date of Patent: Jan. 25, 1994

[54] TILT AND SLIDE ROOF OPENING AND CLOSING DEVICE, IN PARTICULAR FOR AUTOMOBILE VEHICLES

[75] Inventors: Christian Cheron, Angers; Pierre Thierry, Cholet; Francois De Gaillard, Mouilleron en Pareds, all of France

[73] Assignee: Webasto Heuliez, Les Chatelliers-Chateaumur, France

[21] Appl. No.: 895,991

[22] Filed: Jun. 8, 1992

[30] Foreign Application Priority Data

Jun. 10, 1991 [FR] France .................. 91-07031

[51] Int. Cl.$^5$ .................................. B60J 7/05
[52] U.S. Cl. ................................ 296/223; 296/221
[58] Field of Search ............... 296/216, 220, 223, 224, 296/221, 222

[56] References Cited

U.S. PATENT DOCUMENTS

| | | | |
|---|---|---|---|
| 4,403,805 | 9/1983 | Strem, Jr. et al. | 296/221 |
| 4,422,687 | 12/1983 | Kaltz et al. | 296/221 |
| 5,066,068 | 11/1991 | Suzuki et al. | 296/221 |

Primary Examiner—Dennis H. Pedder
Attorney, Agent, or Firm—Bachman & LaPointe

[57] ABSTRACT

A tilt and slide roof opening and closing device adapted to be fixed to the top of a roof comprises two pairs of carriages guided in rails by a pair of cables and a pair of slides carrying a mobile panel. The slides are articulated by a pair of links carrying three operating studs accommodated and moving in guide paths. Each link is coupled to a rear carriage to pivot freely about an axis. Each front carriage carries an operating stud accommodated and moving in a guide path. The thickness of the roof opening and closing device is less than 18 mm.

17 Claims, 3 Drawing Sheets

TILT AND SLIDE ROOF OPENING AND CLOSING DEVICE, IN PARTICULAR FOR AUTOMOBILE VEHICLES

BACKGROUND OF THE INVENTION

1. Field of the Invention

The invention concerns a roof opening and closing device, in particular for automobile vehicles, comprising a pair of rails fixed to the top of the roof of the vehicle on either side of an opening in the roof, a front carriage pair and a rear carriage pair adapted to be moved in longitudinal translation in the rails by a pair of cables, and an articulation mechanism functionally related to the carriages and a pair of slides carrying a mobile panel to tilt the mobile panel and slide it over the roof of the vehicle, each slide having a front part and a rear part.

2. Description of the Prior Art

As a general rule, a roof opening and closing device of this kind is fixed directly to the top of the roof of a vehicle as an adaptation. These known devices have the drawback of having a significant thickness above the roof of the vehicle. This increased thickness significantly degrades the drag factor of the vehicle and so compromises its performance. Also, asperities in the roof surface due to the thickness of a device of this kind give rise to turbulence producing noise which is disagreeable to the vehicle passengers. Furthermore, its great thickness is detrimental to the general esthetics of the vehicle.

Until now articulation mechanisms for the mobile panel enabling it to tilt and slide over the vehicle roof, in the case of a roof opening and closing device fixed to the top of the vehicle roof, have required rails of significant height and therefore a significant thickness of the roof opening and closing device to accommodate the members required to tilt and slide the mobile panel.

An object of the present invention is to alleviate these drawbacks of the prior art. A particular objective of the invention is to propose a roof opening and closing device which has the least possible thickness above the vehicle roof, this thickness not exceeding 18 mm.

Essentially, a roof opening and closing device in accordance with the invention comprises a first front carriage pair functionally related to first guide path means at the front of the slide to raise the mobile panel above the roof when it slides and a second rear carriage pair functionally related to second, third and fourth guide path means at the rear of the slide through the intermediary of a pair of links to raise the mobile panel above the roof when it slides and to tilt it. The links make it possible to reduce significantly the height of the rails and therefore the thickness of the roof opening and closing device whilst retaining the facility for the mobile panel to tilt and slide over the vehicle roof.

SUMMARY OF THE INVENTION

More specifically, the invention concerns a roof opening and closing device, in particular for automobile vehicles, comprising:

a pair of rails adapted to be fixed to the top of the roof of the vehicle one on each side of an opening in the roof;

a front carriage pair and a rear carriage pair adapted to be moved in longitudinal translation in the rails by a pair of cables;

an articulation mechanism functionally related to the carriages and a pair of slides carrying a mobile panel to tilt the mobile panel and slide it over the roof of the vehicle, each slide having a front part and a rear part, said mechanism comprising:

first guide path means formed in the thickness of the slide at the front thereof;

second guide path means formed in the thickness of the slide at the rear thereof;

third guide path means formed in the thickness of the slide and substantially superposed to the second guide path means;

fourth guide path means formed in the thickness of the slide and to the rear of the second and third guide path means;

a pair of links each carrying first, second and third operating members respectively accommodated and moving in the second, third and fourth guide path means, each link being rotationally coupled to a rear carriage and each front carriage carrying a fourth operating member accommodated and moving in the first guide path means.

Other features and advantages of the invention will emerge more clearly from the following description with reference to the appended drawings.

DETAILED DESCRIPTION OF THE INVENTION

Figure 1:
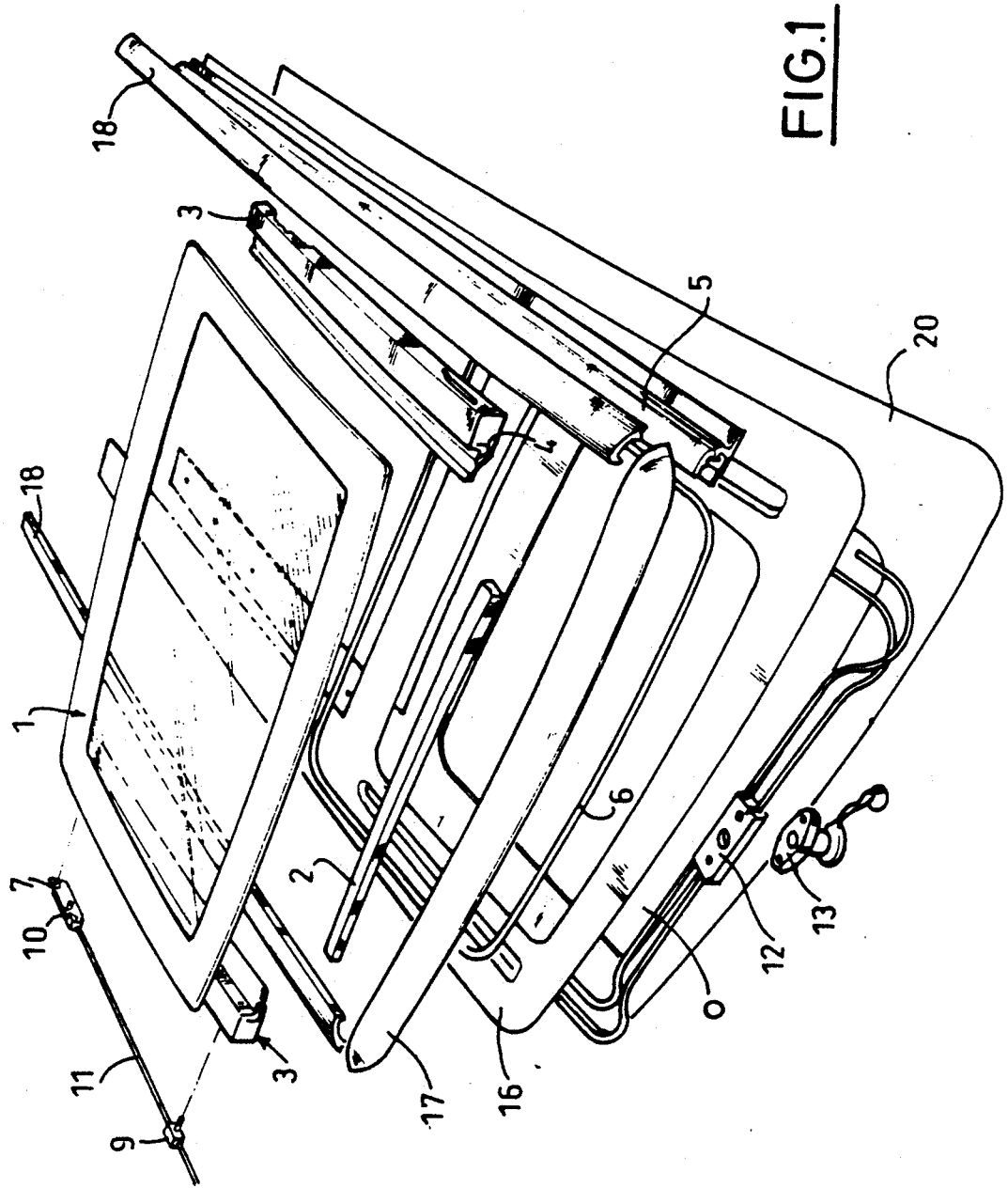
FIG. 1 is an exploded perspective view of a roof opening and closing device in accordance with the invention.

Referring to FIG. 1, the roof opening and closing device comprises a gutter plate 16 and its seal 20 fixed to the top of the roof 8 and having an inner part substantially matching the shape of an opening O formed in the vehicle roof, a pair of rails 5 (of which only one is shown in this figure) disposed one on each side of the lateral edges of the opening and fixed to the vehicle roof, two pairs of carriages 9, 10 mobile in longitudinal translation in the rails 5, a pair of slides 3 carrying a mobile panel 1 and functionally related to the mobile carriages 9, 10 in order to tilt and/or slide the mobile panel over the vehicle roof in response to the section of a pair of cables 11. The cables 11 are mobile in translation in opposite directions and are operated within a cable guide tube assembly 12 by a handle 13 or any analogous cable drive means such as an electric motor, for example. Facing members such as a front embellisher 17 and a pair of side embellishers 18 are respectively disposed at the front of the roof opening and closing device and at the sides thereof to cover the rails 5. The lateral embellishers 18 may be formed in the rails 5. The mobile panel is stiffened at the front by a transverse front stiffener 2. A seal 6 is fitted to the surround of the opening in the roof between the gutter plate 16 and the mobile panel 1. The two pairs of mobile carriages 9, 10 comprise a first carriage pair 9 and a second rear carriage pair 10, one front carriage and one rear carriage being operated by the same cable 11. The slides 3 are stiffened widthwise by a stiffener 4.

the roof opening and closing device in accordance with the invention described above is adapted to be fitted to the top of the roof of a vehicle either during manufacture or as an adaptation.

Figure 2:
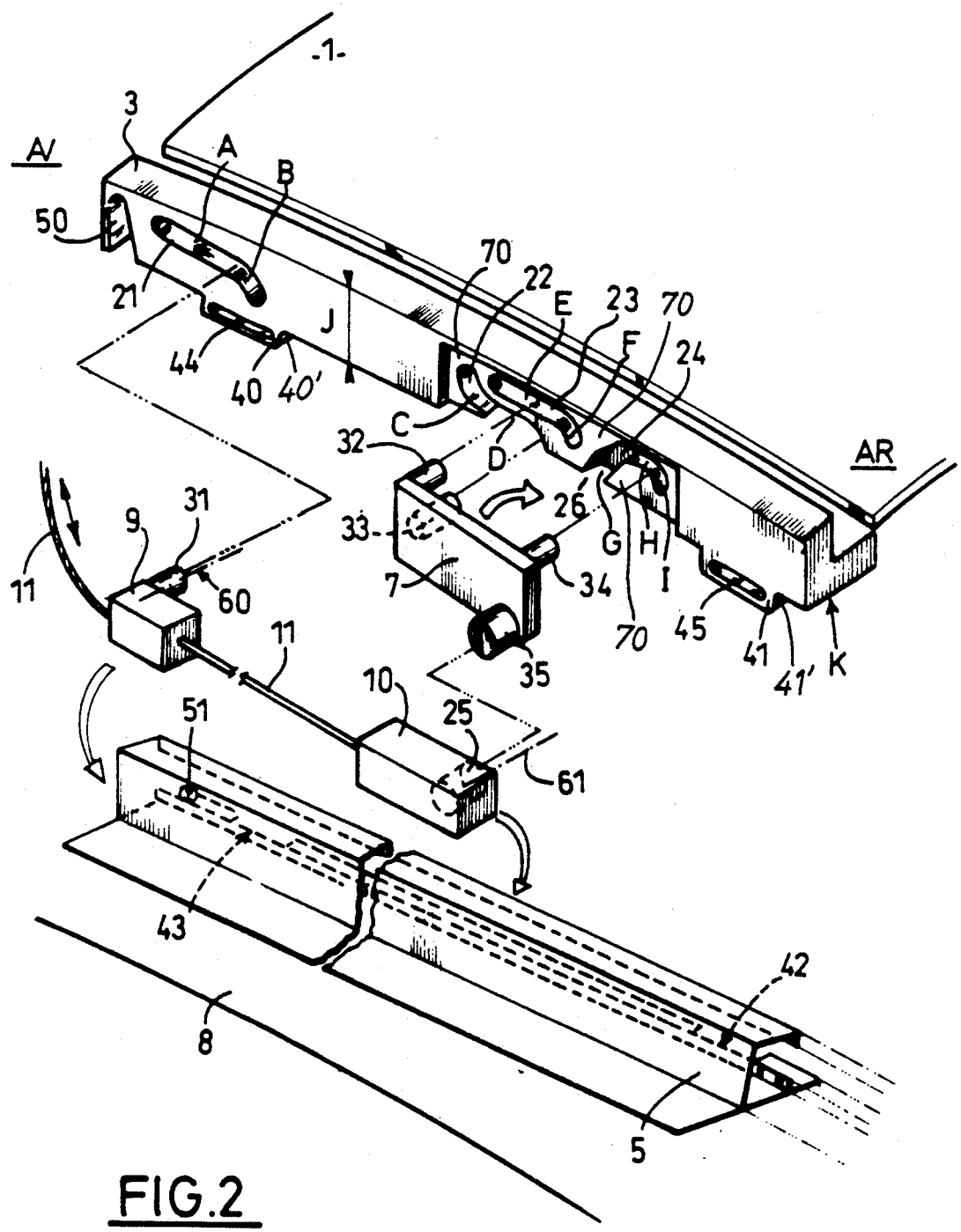
FIG. 2 is a perspective view of a mobile panel articulation mechanism of this device.
Figure 3A:
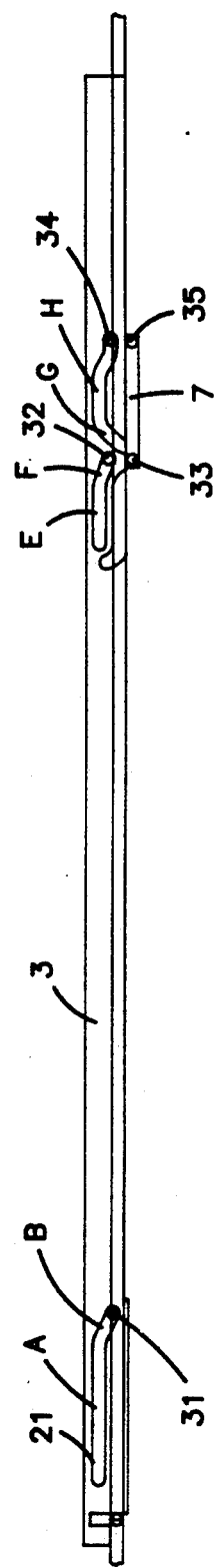
FIGS. 3A through 3C are side views illustrating the different positions attainable by the roof device of the present invention.
Figure 3B:
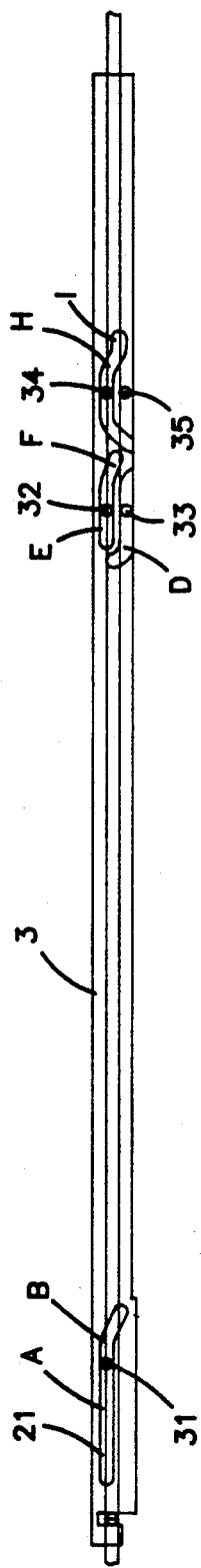
Figure 3C:
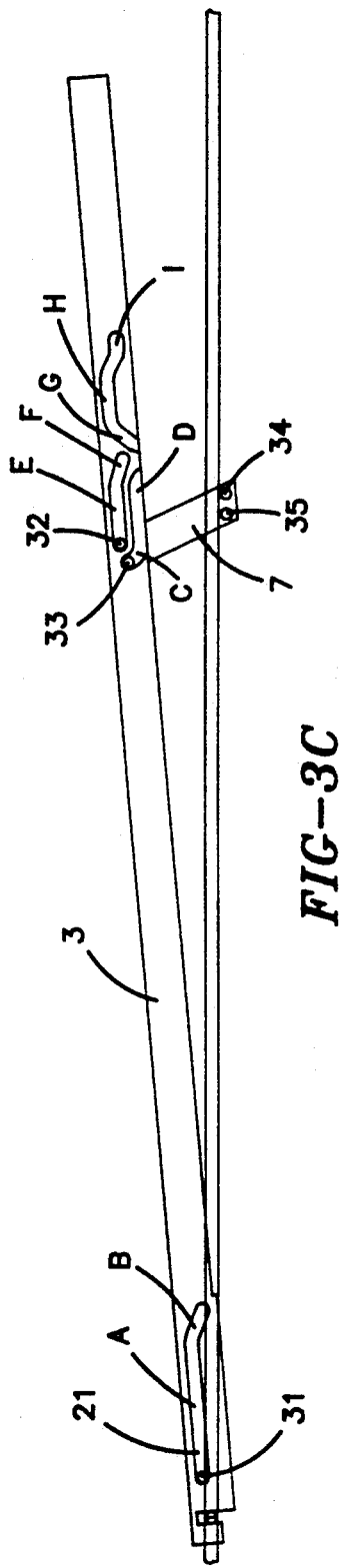

FIG. 2 shows the righthand side of the roof opening and closing device from FIG. 1 and therefore the righthand mobile panel articulation mechanism. The righthand and lefthand articulation mechanisms are symmetrical and therefore only the articulation mechanism on the righthand side of the roof opening and closing device in accordance with the invention as shown in FIG. 1 will be described hereinafter.

Referring to FIG. 2, the articulation mechanism comprises guide path means 21, 22, 23, 24 formed in the thickness of the slide 3, a link 7 carrying operating members 32, 33, 34 accommodated and moving in the respective guide path means 22, 23, 24, a rear carriage 10 functionally relatd to the link 7 and a front carriage 9 carrying a stud 31 accommodated and moving in the guide path means 21. The front carriage 9 and the rear carriage 10 are joined by a cable 11 which extends beyond the front carriage 9 into the cable guide tube assembly 12. Consequently the front and rear carriages 9 and 10 are moved in longitudinal translation by the cable 11 in the rail 5 which runs along the lateral edge of the opening. As shown in this figure, the length of the slide 3 is substantially equal to a lateral dimension of the mobile panel 1 and the slide 3 has a substantially L-shape cross-section to carry the mobile panel 1 which is fixed to it by adhesive bonding or any other equivalent means.

The guide path means 21 is at the front of the slide facing the front carriage 9 and the guide path means 22, 23 and 24 are at the rear of the slide facing the rear carriage 10. The guide path means 23 is substantially superposed to the guide path means 22 and the guide path means 24 is to the rear of the two guide path means 22 and 23.

A recess 70 near the guide path means 22, 23, 24 is formed in the thickness of the slide 3 to receive the link 7. The operating studs 32, 33 and 34 are on the inside surface of the link 7 relative to the opening in the vehicle roof, that is to say relative to the mobile panel 1, to slide in the guide path means 22, 23 and 24. As shown in this figure, the two operating studs 32 and 33 are superposed at one end of the link in the roof closed position, the third operating stud 34 being at the other end of the link. The link 7 is joined to the carriage 10 by a rotation stud 35 on the outside surface of the link relative to the opening, the rotation stud 35 being received in an opening 25 formed in the thickness of the rear carriage 10 in which the link rotates freely. Consequently, the link 7 and the rear carriage 10 are rotatable about an axis 61 mobile in longitudinal translation along the rail 5. The rotation stud 35 and the operating stud 34 have longitudinal axes which are substantially superposed in the roof closed position.

In the direction towards the rear of the slide 3 the guide path means 21 comprises a substantially horizontal part A followed by a curved part B descending towards the vehicle roof. In this same direction the guide path means 22 comprises a curved part C descending towards the roof followed by a substantially horizontal part D having only one wall guiding the operating stud 33. In this same direction the guide path means 23 comprises a horizontal part E substantially parallel to the horizontal part D followed by a curved part F descending towards the roof. In this same direction, towards the rear of the slide 3, the guide path means 24 comprises a curved part G ascending away from the roof and having an open end followed by a substantially horizontal part H parallel to the part E, followed in turn by a curved part I descending towards the roof.

The slide 3 comprises two bosses 40, 41, having abutments 40', 41' on its lower surface K with edges forming abutments in corresponding openings 42, 43 in the rail 5 facing the slide to lock it in the roof closed position and to prevent any unwanted vertical movement of the mobile panel in the opening. The mobile panel must move vertically relative to the root surface only when it is superposed to the seal 6, that is to say when the bosses 40, 41 on the slides are respectively facing the openings 42, 43 in the rails. Openings 44, 45 are formed in the bosses 40, 41 in the width and the thickness of the slide 3 to take up the play of the mobile panel in the vertical direction perpendicular to the roof surface and to damp the noise when the mobile panel is slid over the top of the roof by virtue of vertical deformation of the bosses 41, 42.

A U-shape cut-out 50 is formed in the thickness of the slide 3 at its front end, facing the roof, to engage a locking stud 51 projecting above the rail 5 facing the slide 3. Of course, the locking stud 51 could equally well be disposed on another component part of the roof opening and closing device. Because of the U-shape cut-out 50, the locking stud 51 constitutes means for immobilizing the mobile panel when the latter is in the tilted or closed position.

The operation of the articulation mechanism will now be described.

As previously described, the front carriage 9 and the rear carriage 10 are simultaneously moved in longitudinal translation in the rail 5 when the handle module 13 is operated. The carriages 9, 10 may be moved in a forward direction (towards the front of the vehicle) to tilt the mobile panel or in a rearward direction (towards the rear of the vehicle) to separate the mobile panel from the seal 6, that is to say to raise it in a vertical direction above the roof 8, and then to slide it towards the rear of the roof. In the roof closed position, the operating stud 31 accommodated in the guide path means 21 is substantially located at the junction between the horizontal part A and the curved part B. The operating stud 32 accommodated in the guide path means 23 is substantially centrally located in the horizontal part E. The operating stud 33 accommodated in the guide path means 22 is substantially centrally located in the horizontal part D. The operating stud 34 accommodated in the guide path means 24 is substantially centrally located in the horizontal part H. In the roof closed position, the operating studs 31, 32, 34 are substantially horizontally aligned relative to the rail 5.

When the handle 13 is turned in the first direction the carriages 9, 10 move towards the front of the roof causing the operating studs 31, 32, 33, 34 to move in the guide path means 21, 22, 23, 24. When the carriages 9, 10 move in this direction the operating stud 31 moves in the horizontal part A of the guide path means 21. The effect of this movement of the operating stud 31 is to hold the front part of the slide at a low level which is its level in the roof closed position. In this position of the slide 3 the U-shape cut-out 50 is engaged with the locking stud 51 to prevent movement in translation of the mobile panel. The forward movement of the rear carriage 10 causes the operating stud 32 to move towards one end of the horizontal part E of the guide path means 23, movement of the operating stud 33 in the curved part C of the guide path means 22 and movement of the operating stud 34 in the curved part G of the guide path means 24. Movement of the rear carriage 10 in this direction causes the link 7 to pivot about the shaft 61 as a result of the cooperation of the rotation stud 35 and the opening 25 and the pivoting of the operating stud 33 relative to the operating stud 32. As this movement continues the operating stud 34 is disengaged from the guide path means 24 at its open end 26, with the result that the substantially rectangular link pivots until its longer dimension is substantially vertical and at an angle of less than 90° to the longitudinal axis of the rear carriage 10. In this position of the link the mobile panel 1 is tilted above the roof 8 of the vehicle, the operating stud 31 immobilized at the end of the horizontal part A of the guide path means 21 then defining an articulation axis 60 for the mobile panel. In this tilted position of the mobile panel the link 7 is immobilized by the two operating studs 32, 33 abutted against the end of the parts C, E of the guide path means 22, 23. If the cables are operated by an electrical device, the movement of the link is monitored by microswitches incorporated into the cable operating device 13.

When the handle 13 is turned in the opposite direction the carriages 9, 10 move towards the rear of the roof either from the tilted position of the mobile panel or from its closed position. In the first case the operating studs 31, 32, 33, 34 follow a path which is the opposite of that explained hereinabove until they reach the roof closed position. From this position, and in response to the action of the carriages 9, 10 driven in the second direction, the operating stud 31 is engaged in the curved part B of the guide path means 21. The same direction of movement causes the operating stud 32 to become engaged in the curved part F of the guide path means 23, the operating stud 33 to be disengaged from the horizontal part D on the guide path means 22 and the operating stud 34 to be engaged in the curved part T of the guide path means 24. The link 7 pivots about the axis 61 as a result of the action of the operating studs 31, 32, 34 engaged in the curved parts B, F, I and so raises the slide 3 as a whole and therefore the mobile panel 1 above the roof, so disengaging the U-shape cut-out 50 from the locking stud 51 and the bosses 40, 41 from the openings 42, 43 and causing the mobile panel to slide towards the rear of the roof, over the latter. Consequently, the mobile panel 1 is first separated from the seal 6 by being raised and then is slid over the roof to uncover the opening. In this position the bosses 40, 41 and the openings 44, 45 damp any vertical displacement of the mobile panel relative to the roof. When the roof is closed by sliding the mobile panel in the opposite direction relative to the roof, the bosses 40, 41 hold the mobile panel in a raised position relative to the seal 6 to prevent the panel 1 rubbing on the seal 6. This raised position is maintained until the bosses 40, 41 are facing the openings 42, 43, whereupon the panel 1 is lowered onto the seal 6, this lowered position of the mobile panel representing closure of the roof.

The roof opening and closing device in accordance with the invention just described achieves the tilt function and the slide over the roof function by virtue of the kinematic design of the link 7. It will be understood that the greater or lesser tilting of the mobile panel depends on the longer dimension of the link 7. Consequently, the tilting capacity of the roof opening and closing device is independent of the height J of the slide. The invention therefore provides a roof opening and closing device having a thickness of 10 mm or less.

Of course, the invention is not limited to the embodiment described hereinabove and other variants thereof are equally feasible without departing from the scope of the invention.

There is claimed:

1. Roof opening and closing device for automobile vehicles, comprising:
    a pair of rails fixed to a top of the roof of said vehicle one on each side of a roof opening;
    a front carriage pair and a rear carriage pair mobile in longitudinal translation in said rails, said carriage pairs being moved in translation by a pair of cables; and
    an articulation mechanism functionally related to said carriage pairs and a pair of slides carrying a mobile panel to tilt said mobile panel and slide it over said roof of said vehicle, each slide having a front part and a rear part, said articulation mechanism for each slide comprising:
    first guide path means formed in a thickness of said slide at the front part thereof;
    second guide path means formed in a thickness of said slide at the rear part thereof;
    third guide path means formed in a thickness of said slide and substantially superposed to said second guide path means;
    fourth guide path means formed in a thickness of said slide and to the rear of said second and third guide path means;
    a pair of links each carrying first, second and third operating members respectively accommodated and moving in said second, third and fourth guide path means, each link of the pair being rotationally coupled to one of the rear carriage pairs and each one of the front carriage pairs carrying a fourth operating member accommodated and moving in said first guide path means.

2. Device according to claim 1 wherein said first, second and third operating members are operating studs on an inside surface of said links relative to the opening adapted to slide in the second, third and fourth guide path means, respectively.

3. Device according to claim 1 wherein said first and second operating members are superposed at one end of said link in a roof closed position, said third operating member being at the other end of said link.

4. Device according to claim 1 wherein each link is coupled to said one of the rear carriage pair by a rotation stud on an outside surface of said link relative to said opening, said rear carriage having a rotation opening adapted to receive said rotation stud which rotates freely in said rotation opening.

5. Device according to claim 4 wherein said first, second and third operating members are operating studs on the inside surface of each link relative to the opening adapted to slide in the second, third and fourth guide path means, respectively and said rotation stud and said third operating stud each have longitudinal axes wherein one of the axes is substantially superposed with respect to the other axes in the roof closed position.

6. Device according to claim 1 wherein said first guide path means comprises in the direction towards the rear of a slide a substantially horizontal part followed by a curved part descending towards said roof.

7. Device according to claim 1 wherein said second guide path means comprises in the direction towards the rear of the slide a curved part descending towards said roof followed by a substantially horizontal part.

8. Device according to claim 1 wherein said third guide path means comprises in the direction towards the rear of the slide a substantially horizontal part followed by a curved part descending towards said roof.

9. Device according to claim 1 wherein said fourth guide path means comprises in the direction towards the rear of the slide a curved part ascending away from said roof followed by a substantially horizontal part followed by a curved part descending towards said roof.

10. Device according to claim 9 wherein said curved part ascending away from said roof of said fourth guide path means has an open end adapted to release said third operating member from said fourth guide path means.

11. Device according to claim 1 wherein a front carriage of the front carriage pair and a rear carriage of the rear carriage pair are caused to move in translation by the same cable.

12. Device according to claim 1 wherein each slide comprises first locking means at its front end adapted to prevent movement in translation of the carriages in a tilted position of said mobile panel.

13. Device according to claim 12 wherein said first locking means comprises a U-shaped cut-out in the thickness of said slide at its front part, the U-shape facing the roof and adapted to be engaged with a complementary member fixed to said rail facing said slide.

14. Device according to claim 12 wherein each slide comprises second and third locking means on the lower surface of said slide to prevent movement of said mobile panel when it is in the closed position.

15. Device according to claim 14 wherein said second and third locking means comprise bosses on said lower surface of said slide having edges forming abutments in openings formed in said rail facing said slide.

16. Device according to claim 15 wherein said bosses on said slide are apertured to constitute dampers.

17. Device according to claim 1 wherein each link is substantially rectangular and said second, third and fourth guide path means of a slide are formed in a recess of said slide, said link being accommodated in said recess of said slide.

* * * * *